Dec. 1, 1931.  E. BEHRINGER ET AL  1,834,760
APPARATUS FOR WARMING ICE CREAM MOLDS
Filed June 22, 1929   2 Sheets-Sheet 1
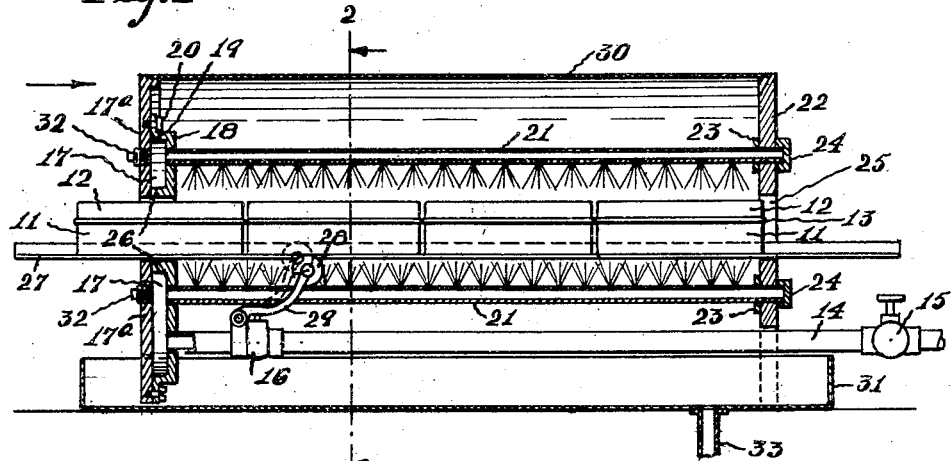
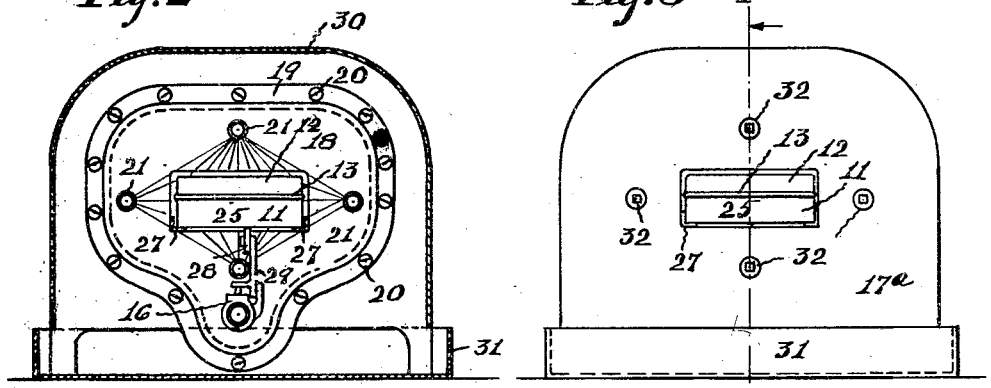
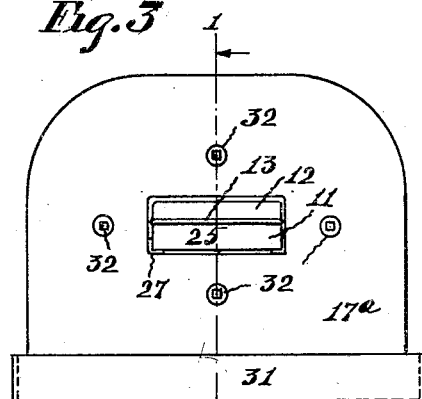
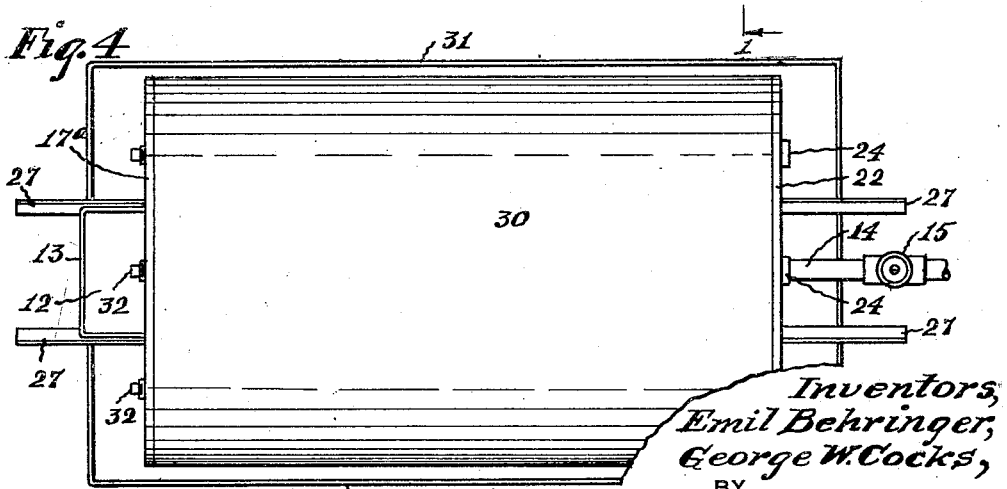
Inventors,
Emil Behringer,
George W. Cocks,
BY Harold D. Penner, ATTORNEY Dec. 1, 1931.  E. BEHRINGER ET AL  1,834,760
APPARATUS FOR WARMING ICE CREAM MOLDS
Filed June 22, 1929  2 Sheets-Sheet 2
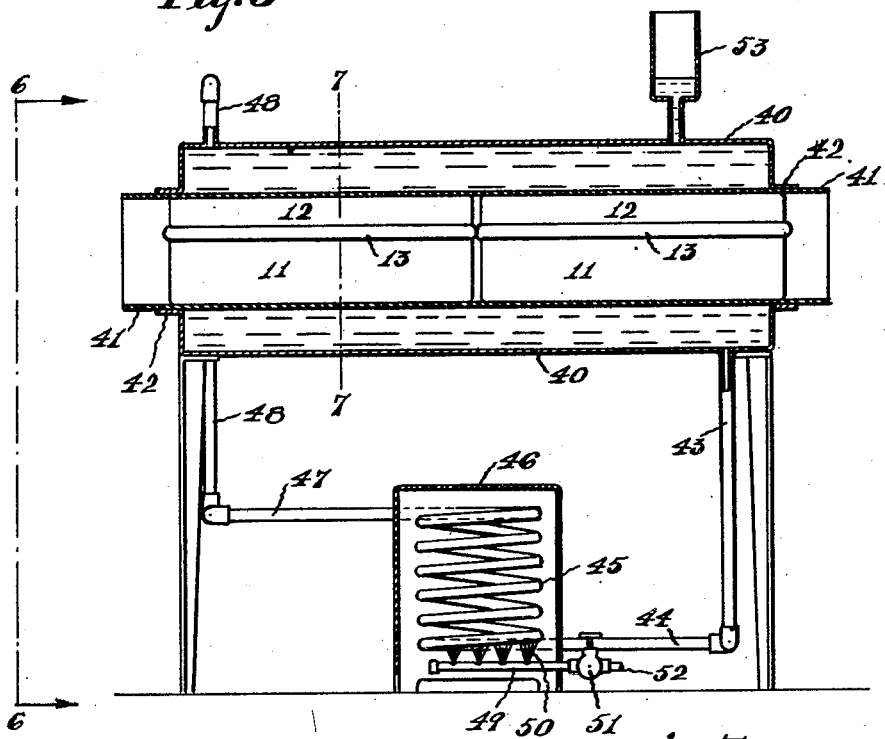
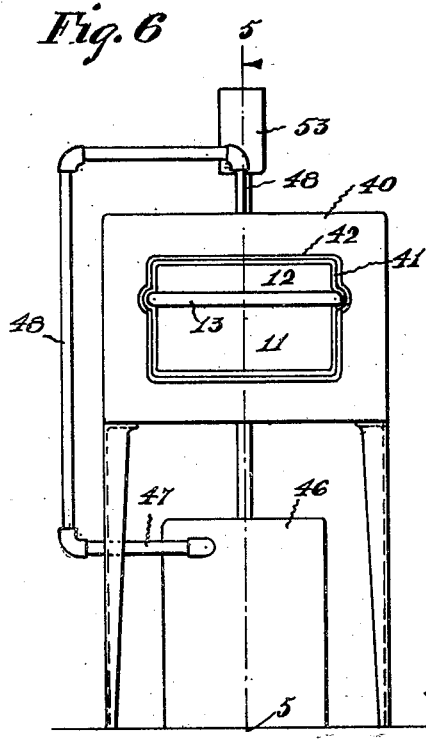
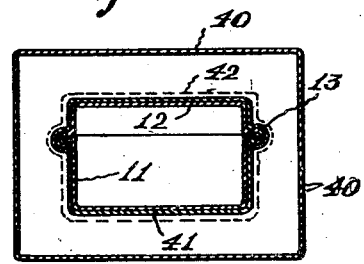
Inventors;
Emil Behringer,
George W. Cocks,
BY Harold D. Perry
ATTORNEY Patented Dec. 1, 1931

1,834,760

UNITED STATES PATENT OFFICE

EMIL BEHRINGER AND GEORGE W. COCKS, OF NEW YORK, N. Y.

APPARATUS FOR WARMING ICE CREAM MOLDS

Application filed June 22, 1929. Serial No. 372,925.

Our invention refers to improvements in apparatus for warming ice cream molds to release the ice cream therefrom, and they consist in the novel features, which are hereinafter described.

One of the objects of our invention is to provide an improved method and apparatus for continually warming ice cream molds as they are received from the hardening room of an ice cream producing plant to release the ice cream therefrom.

Another object of our invention is to save time and labor in the operation of warming ice cream molds.

A still further object of our invention is to provide a means for regulating the time of warming said molds and the rise of temperature thereof during the operation of our apparatus.

A further object of our invention is to reduce the effect on the ice cream of the said warming of the molds thereof.

A still further object of our invention is to have our methods employed for warming ice cream molds simple, effective and economical and the apparatus employed therein simple, durable and inexpensive.

Other objects and advantages will hereinafter appear.

We attain these objects by the methods and apparatus, two modifications of which are illustrated in the accompanying drawings or by any mechanical equivalents and obvious modifications of the same.

In the drawings,

Fig. 1 is a longitudinal central vertical section of the preferred form of our apparatus on the lines 1—1 of Figs. 2 and 3, looking in the direction of the arrows, and showing same parts in elevation;

Fig. 2 is a vertical section on the line 2—2 of Fig. 1, looking in the direction of the arrows, and showing some parts in elevation.

Fig. 3 is an end view of said apparatus, looking from left to right in Fig. 1; and Fig. 4 is a top plan view of the said apparatus.

Fig. 5 is a longitudinal central vertical section of another form of our apparatus on the line 5—5 of Fig. 6, looking in the direction of the arrows;

Fig. 6 is an end view of the apparatus shown in Fig. 5, looking from left to right in Fig. 5; and Fig. 7 is a vertical section of a part of the apparatus shown in Fig. 5 on the line 7—7 of Fig. 5.

Like numerals refer to like parts throughout the several views:

11 designates molds of ice cream, of the usual construction, and 12 designates the covers thereof, having thereon beads 13; on arriving from the freezer the ice cream is frozen to the interior of said molds 11 and covers 12, and, to raise the temperature of said molds and covers sufficiently to release the ice cream contained therein we prefer the following method and apparatus.

Water from a suitable supply is brought by means of a pipe 14, which is shown in Fig. 1 and has thereon a regulating valve 15 and an automatic whistle valve 16, to a chest 17 which is shown as enclosed between the left hand end plate 17$^a$ and the dished member 18, which is secured thereto by means of a flange 19 encompassing said member 18, and screws 20.

Apertured dead-end tubes 21 are shown as secured each at one end thereof to said member 18 in communication with said chest 17 and at the other end thereof to the right hand end plate 22.

The ends of said tubes 21 may be threaded into suitable openings in said member 18 and plate 22; threaded washers or nuts 23 on said tubes 21 and caps 24, for closing the right hand ends of said tubes 21, are placed on opposite sides of said plate 22, thereby assisting in holding the same in position.

A substantially rectangular opening 25 is provided in each of said end plates 17$^a$ and 22 and in said member 18, which has thereon an interior rim or flange 26 extending to the inner side of said plate 17$^a$, to prevent leakage of water from said chest 17, a suitable packing or gasket may be interposed between the end of said rim 26 and the inner side of said plate 17$^a$; another packing or gasket may also be interposed between said flange 19 and the side of said plate 17ª at the outer periphery thereof.

A trackway consisting of two angular bars 27, is placed in said openings 25, transversely to said plates 17ª and 22 and secured thereto, forming therewith, a unitary frame or structure for slidably supporting thereon a train of said ice cream molds 11—12, which are continually introduced at the left hand end of said frame through one of said openings 25 in said plate 17ª and are moved towards the right hand end of said frame towards the opening 25 in said plate 22.

A trolley 28 at the upper end of a lever 29, which is pivotally connected to said valve 16, is positioned in the path of said train of molds 11—12, as shown in dotted lines in Fig. 1 to be depressed by the underside of said molds, thereby swinging said levers 29 towards the right in Fig. 1 and thereby opening said valve 16, thereby causing a discharge of water through said chest 17 and apertured tubes 21 in the form of multiple sprays directed towards said molds 11—12, whereby said molds 11 and their covers 12 have their temperature increased sufficiently to release the ice cream contained therein.

A hood or part casing 30 is placed over said frame 17ª—22—27, with the ends thereof to fit in a recess provided therefor on the inner side of each of said plates 17ª and 22, to intercept the spray of water, glancing off or repelled from said molds 11—12 after impinging thereon, and direct it downwardly into a drip pan 31, from which it may be removed by means of a suitable waste pipe 33.

Water is continually supplied through said pipe 14 and valve 15, which may be manually opened at the beginning of the operation and closed at the end of the operation.

Said molds 11—12 may be fed through the above described apparatus either manually or by means of any suitable automatic devices, if desired.

The rate of flow or quantity of water discharged through the apparatus during any time may also be regulated by means of said valve 15, which may be open to any desired extent during the operation, in this way regulating the rise of temperature of said molds 11—12 for a given rate of feeding of said train of molds through the apparatus, or the speed of said feeding for a required increase of said temperature, or both.

Plugs 32 are provided in the plate 17ª opposite said tubes 21, for the inspection and cleaning of the same.

In the modification of our method and apparatus, shown in Figs. 5, 6 and 7, a constant quantity of water is being circulated through the apparatus, and heat is being supplied to the water by means of a suitable furnace or heater, to compensate for the loss of heat incurred by the water in raising the temperature of the ice-cream molds.

In this modification we employ a closed water tank or shell 40, which has a substantially rectangular duct 41 passing therethrough.

Said duct may be secured at its ends to flanges 42 at the ends of said tank or shell 40 in a way to form a watertight joint therewith.

A downwardly extending tube 43 is shown in Fig. 5 as connected at one end thereof to the underside of said shell 40 in communication therewith near the right hand end of said shell 40, as shown in Fig. 5, and at the other end thereof to a branch 44 on the lower end of a vertically disposed tubular coil 45, enclosed by a furnace casing 46; the upper end of said coil 45 is shown as connected by means of a branch 47 to the lower end of a rising tube 48, the upper end of which is connected to the top of said shell 40, in communication therewith at the left hand end of said shell, as shown in Fig. 5.

Said branches 44 and 47 are shown in Fig. 5 as passing through suitable openings provided therefor in said casing 46.

A gas range or heater 49 is shown at the lower end of said furnace casing 46, inside thereof, in operation, having multiple jets of flame 50 directed towards the lower end of said coil 45, thereby supplying heat to the water circulating therethrough.

A valve 51 is placed between said heater 49 and a gas supply pipe 52, a fragment of which is shown in Fig. 5, whereby to regulate the intensity of the flame jets 50 by regulating the admission of gas through said pipe 52. An open overflow pot 53 is connected to the top of said shell 40, for the increase of the volume of water in said shell, which is due to heating, to flow thereinto.

In the operation of this modification of our ice cream mold warmer the molds 11—12 are successively introduced into the said duct 41 at the left hand end thereof in Fig. 5, and moved along said duct from left to right in Fig. 5, each successively mold propelling the preceding one until the latter is removed from the right hand end of said duct 41 in Fig. 5; some of the heat contained in the water in said shell 40 is communicated to said molds 11—12, thereby raising their temperature sufficiently to release the ice cream contained therein without affecting the frozen state of the bulk of the ice cream.

By varying and adjusting the supply of gas to the heater 49 by means of said valve 51 the temperature of the water in said shell 40 or the rate of feeding said molds 11—12 through said duct 41, or both, may be varied and adjusted at will.

Notches are provided in the sides of said duct 41 interiorly thereof to fit said beads 13 as shown in Figs. 6 and 7.

Any other form of heater, such as an electric heater, or an oil stove may be used instead of the gas range 49, if desired, and any suitable fluid other than water may be employed in the modification of our method and apparatus, which is illustrated in Figs. 5, 6 and 7; also air instead of water may be employed in the modification of our method and apparatus, illustrated in Figs. 1, 2, 3 and 4 of the drawings.

Many other changes may be made in our methods and apparatus for warming ice cream molds without departing from the main scope of our invention, and parts of our invention may be used without other parts.

We claim as our invention and desire to secure by Letters Patent:

1. In an apparatus for warming ice cream molds a heat imparting outfit, a means for feeding molds thereinto and for removing them therefrom, apertured members on said outfit, disposed for directing therefrom onto said molds jets of a fluid having a higher temperature than said molds, thereby consummating the warming of said molds, a means for supplying fluid to said members during the passage of said molds through said outfit and an automatic valve means operable by the presence of a mold in said apparatus for starting and stopping the action of said supplying means at the beginning and end of said passage, thereby starting and stopping the action of said jets.

2. In an apparatus for warming ice cream molds a heat imparting outfit, a means for feeding molds thereto and for removing them therefrom, a fluid chest on said outfit, apertured members, in communication with said chest and disposed for directing therefrom onto said molds jets of fluid having a higher temperature than said molds, a conduit for supplying said chest with said fluid, during the passage of said mold through said outfit, thereby consummating the warming of said molds, and a valve in said conduit operated by the passage of molds through said apparatus.

3. In an apparatus for warming ice cream molds a heat imparting outfit, a means for feeding molds thereto and for removing them therefrom, a fluid chest on said outfit, apertured members, in communication with said chest and disposed for directing therefrom on to said molds jets of a fluid having a higher temperature than said molds, a conduit for supplying said chest with said fluid during the passage of said molds through said outfit, a whistle valve on said conduit operable only by contact with a mold in said apparatus for starting and stopping the flow of said fluid through said conduit at the beginning and end of said passage.

4. In combination, a casing having front and rear end walls provided respectively with entrance and exit openings, a track extending horizontally through said openings, the front end wall being provided with a water chest, a water supply pipe extending through the rear wall along under said track and into said water chest, an inlet water regulating valve and an automatic shut off valve in said pipe; and spray devices extending from said water chest rearwardly to and through said end plate.

5. In combination, a casing having front and rear end walls and closed at the top and sides, the end walls having respective entrance and exit doors, a track extending horizontally through said doors, the front end wall having a water chest surrounding said entrance door, a water inlet pipe having a control valve, said water pipe extending into said water chest, a plurality of spray tubes extending from said water chest backwardly through said rear end wall and closure caps on the remote ends of said spray tubes.

6. An apparatus of the class described comprising a housing having front and rear plates and closed sides and top, said end plates having respective entrance and exit openings, a hollow casting bolted to the front plate and surrounding the entrance opening, to provide a water chest, spray tubes connected with the water chest at opposite sides of, and above and below, said entrance opening and extending backwardly in parallelism to the rear wall, a track extending endwise through said casing and a controlled water supply in connection with said water chest.

7. An apparatus of the class described embodying a housing having front and rear walls and a top and sides, the front and rear walls having respective entrance and exit openings, a track extending through said openings, a water chest surrounding the said entrance opening, perforated pipes in communication with said water chest at points at opposite points around said track; a water inlet pipe connected to said water chest, a regulating valve in said water inlet pipe and an automatically operated shut off valve also in said pipe and opened by contact with ice cream molds on said track.

8. In an apparatus of the class described a casing closed at the top and sides and having front and rear end plates provided with respective entrance and exit openings; a track extending through casing and said openings and adapted to support ice cream molds moved through said casing; a water chest bolted to said front plate and having an opening in registration with said entrance opening, a water inlet pipe connected with the lower portion of said water chest, an automatic valve in said inlet pipe for closing the supply when no ice cream molds are on said track; and spray tubes extending from said water chest backwardly along said track and through said rear end plate of the casing.

9. In an apparatus for warming ice cream molds, a casing having front and rear walls and a top and sides, said front and rear walls having respective entrance and exit openings, a track for molds extending through said casing; a water chest on said front wall, spray pipes connected to said water chest, a water supply also connected to said chest; and a valve in said supply pipe automatically operated to open and close the water supply by the movement of said molds along the track.

10. In an apparatus for warming ice cream molds, a casing, openings in the front and rear ends thereof, a water chest secured to the front end of said casing, a track for supporting molds in end to end relation to be pushed along said track, perforated jet tubes connected to said water chest at points around said track and extending rearwardly parallel with said track and through said rear end of the casing; a water supply pipe connected with said water chest, a valve in said supply pipe, said valve being provided with an arm and a roller adapted to maintain rolling contact with the bottoms of said molds to maintain said valve open, and means for closing said valve when the roller is out of contact with the bottom of a mold.

Signed at New York, in the county of New York and State of New York this 20th day of June, A. D. 1929.

EMIL BEHRINGER.
GEORGE W. COCKS.